(12) United States Patent
Goodson (10) Patent No.: US 7,562,448 B2
(45) Date of Patent: Jul. 21, 2009

(54) METHOD OF PREVENTING ELECTRICALLY INDUCED FIRES IN GAS TUBING

(76) Inventor: Mark E. Goodson, 3370 Forest Glen, Corinth, TX (US) 76210

( * ) Notice: Subject to any disclaimer, the term of this patent is extended or adjusted under 35 U.S.C. 154(b) by 297 days.

(21) Appl. No.: 11/183,527

(22) Filed: Jul. 18, 2005

(65) Prior Publication Data
US 2007/0012472 A1 Jan. 18, 2007

(51) Int. Cl.
*H01R 43/00* (2006.01)
(52) U.S. Cl. .............................. 29/854; 29/857; 29/868; 174/51; 174/78; 138/121; 428/36.91
(58) Field of Classification Search .................. 29/828, 29/854, 857, 868; 439/92, 95, 100; 174/78, 174/51, 84 S; 138/121
See application file for complete search history.

(56) References Cited

U.S. PATENT DOCUMENTS 3,624,627 A * 11/1971 Evans ........................ 137/557
4,107,452 A * 8/1978 Razvi ........................ 174/84 S
4,449,853 A * 5/1984 Mennella et al. ............ 405/184
4,660,908 A * 4/1987 Ballester ..................... 439/100
7,044,167 B2 * 5/2006 Rivest ........................ 138/121

* cited by examiner

*Primary Examiner*—Rick K Chang
(74) *Attorney, Agent, or Firm*—David W. Carstens; Carstens & Cahoon, LLP (57) ABSTRACT

The present invention provides a method of preventing electrically induced fires in household gas tubing. The method involves coupling conductive wire and conductive appliance connectors to the gas tubing, wherein the conductive wire provides direct electrical contact between the appliance connectors affixed to the ends of the tubing. In the event that an electrical charge goes to ground via the gas tubing assembly (e.g., lightning strike or appliance short), damage to the gas tubing is prevented by the conductive wire and end connectors providing a low resistance electrical path that allows the current to pass over the gas tubing assembly without the gas tubing itself actually having to carrying the load. This reduces the risk of a rupture in the gas tubing from electrical insult, which could result in fire.

7 Claims, 6 Drawing Sheets

CSST with Single Grounding Wire

CSST with Multiple Strands of Grounding Wire

Figure 6A CSST with Single Grounding Wire

Figure 6B CSST with Multiple Strands of Grounding Wire

METHOD OF PREVENTING ELECTRICALLY INDUCED FIRES IN GAS TUBING

TECHNICAL FIELD

The present invention relates generally to the prevention of fires caused by lightning and more specifically to fires involving gas leaks in Corrugated Stainless Steel Tubing and similar gas lines (sometimes referred to as appliance connectors).

BACKGROUND OF THE INVENTION

Corrugated Stainless Steel Tubing (CSST) is a relatively new building product used to plumb structures for fuel gas in lieu of conventional black pipe. The advantages that are offered for CSST include a lack of connection and a lack of threading. In essence, it is a material that results in substantial labor savings relative to using black pipe.

CSST differs from black pipe in a number of ways. In a CSST system, gas enters a house at a pressure of about 2 psi and is dropped to ~7" WC by a regulator in the attic (assuming a natural gas system). The gas then enters a manifold and is distributed to each separate appliance via "home runs." Unlike black pipe, a CSST system requires a separate run for each appliance. For example, a large furnace and two water heaters in a utility closet will require three separate CSST runs. With black pipe, the plumber may use only one run of 1" pipe and then tee off in the utility room. Therefore, the requirement of one home run per appliance significantly increases the number of feet of piping in a building.

CSST is sold in spools of hundreds of feet and is cut to length in the field for each run. In this regard, CSST has no splices or joints behind walls that might fail. CSST also offers an advantage over black pipe in terms of structural shift. With black pipe systems, the accommodations for vibrations and/or structural shifts are handled by appliance connectors, a form of flexible piping.

However, the thin flexible walls of CSST have a propensity to fail when exposed to electrical insult, particularly lightning. CSST is very thin, with walls typically about 10 mils in thickness. The desire for easy routing of the tubing necessitates this lack of mass. However, it also results in a material through which electricity can easily puncture.

Once the tubing has been perforated, it is possible for the escaping gas to be ignited by the metallic by-products of the arcing process, by auto-ignition, or by adjacent open flames.

The theoretical energy level required to melt a specimen can be compared by using both heat capacity and melting temperature. The heat capacity is the amount of heat needed to raise the temperature of either sample one degree Celsius. Changing the temperature from an initial to the melting temperature requires the heat capacity to equal:

$$q = C \cdot m \cdot \Delta T_m + m \cdot H_f$$

where:

C is the specific heat $H_f$ is the heat of fusion M is the mass of the specimen $\Delta T_m$ is the change from the initial temperature to the melting temperature Based on this equation, one can derive theoreature values for heat capacity for an equivalent 100 mil diameter hole in different materials. The amount of energy required to create a 100 mil diameter hole is much higher for black pipe than other pipe materials including aluminum, copper and CSST. The amount of energy required to melt a conventional half inch black pipe is about 15 times the energy required to similarly melt CSST, about 10 times the energy required for aluminum and five time that for copper. Thus, the thickness of the pipe plays a critical role.

Field data indicates that lightning damage to black pipe is sometimes so small that it is often only visible with microscopic analysis and limited to a small pit that does not leak. Lightning strikes involving CSST create leaks that vary from pinhead size to almost quarter inch holes.

Lightning strikes vary in current from 1,000 (low end) to 10,000 (typical) to 200,000 (maximum) amperes peak. Mechanical damage caused by heating is a function of the current squared multiplied by time. Thus, the current is the dominant factor creating the melting of gas tubing.

One of the underlying issues with CSST is that it is part of the electrical grounding system. For reasons of electric shock prevention (and also elimination of sparks associated with static electricity), it is desirable to have all exposed metal within a structure bonded so that there are no differences of potential. However, there are limitations to applying DC circuit theory (or even 60 Hz steady state phasor theory) in this situation because lightning is known to have fast wavefronts. While the reaction of large wires and irregular surfaces is predictable at 60 Hz, the fast wave fronts associated with lightning may cause substantial problems with CSST, given its corrugated surface. Moreover, new house construction has shown very tight bends and routing of CSST immediately adjacent to large ground surfaces, creating the potential for arcs created by lightning strikes. Testing of CSST under actual installed conditions using transient waveforms may well show further limitations that conventional bonding and grounding cannot accommodate.

The typical gas line or gas system, whether black pipe or CSST, is usually not a good ground. The metal components that make up a gas train are made from materials that are chosen for their ability to safely carry natural gas (or propane) and the accompanying odorant. These metallic components are not known for their ability to carry electric current. To further compound matters, it is not uncommon to find pipe joints treated with Teflon tape or plumber's putty, neither of which is considered an electrical conductor. The Fuel Gas Code (NFPA 54) calls for above ground gas piping systems to be electrically continuous and bonded to the grounding system. The code provision also prohibits the use of gas piping as the grounding conductor or electrode.

Appliance connectors, which are prefabricated corrugated gas pipes, are also known to fail from electric current, whether this current is from lightning or from fault currents seeking a ground return path. These connectors usually fail by melting at their ends (flares) during times of electrical overstress. These appliance connectors are better described ANSI Z21.24, *Connectors for Indoor Gas Appliances*, the contents of which are hereby incorporated by reference. A gas appliance that is not properly grounded is more susceptible to gas line arcing than a properly grounded appliance. The exact amount of fault current, however, will depend upon the impedances of the several ground paths and the total fault current that is available. For example, air handlers for old gas furnaces seem to be the most prone. Typically, an inspection will reveal that the power for the blower motor uses a two-conductor (i.e. non-grounded) power cord.

A primary indicator that is found in these types of fires is the focal melting of the gas line at the brass nut/connector. It is well known and appreciated that the flame that is fueled from a gas orifice does not normally make physical contact with the orifice itself. Rather, there is some distance between the flame and orifice depending on the gas pressure, the size of the orifice, available oxygen, and the mixing or turbulence.

In short, the leaking gas is too rich to burn at the point of escape. In addition, gas that is under pressure will cause a very small amount of cooling to occur when the gas escapes from such a leak or orifice due to adiabatic cooling. Both of these factors indicate that a gas line would be least likely to melt at a connection if the melting were indeed caused by the heat from a flame, as opposed to electrical insult.

For the several above described reasons, it would be desirable to have a CSST system or a gas appliance connector that is capable of carry current in the case of electrical arcing or carrying fault currents without suffering perforation or melting at the connector end, thereby preventing the leaking and ignition of gas fuel. It is further desirable to have a CSST or gas appliance connector function in such a way that minimizes the chances of having perforations created on its side walls due to electric injury (i.e. from lighting and similar phenomenon).

SUMMARY OF THE INVENTION

The present invention provides a method and apparatus for preventing electrically induced gas fires involving Corrugated Stainless Steel Tubing (CSST) and appliance connectors. Connectors for coupling the CSST (or gas appliance connectors) to gas lines and appliance are affixed at each end of the tubing. These connectors are made of a conductive material such as brass. Conductive ground wire, such as #8 AWG copper, provides a direct electrical contact between the end connectors. The ground wire can be either a single wire or a wire mesh; in mesh form, the mesh serves as an outer shield for the gas tubing. If an electrical charge goes to ground via the CSST or the appliance connector, such as from a lightning strike or an appliance short, the majority of the current is carried by the conductive wire rather than the CSST or appliance connector itself, thus preventing damage to the CSST from the current. When using a mesh type shield, if the CSST or appliance connector receives an electrical charge from arcing to the side walls, the mesh serves as a current shunt and thus both shunts the current and causes the charge on the actual CSST (or appliance connector) wall to be dissipated over a larger area.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

FIGS. 1-4 illustrate common scenarios for electrically induced gas fires involving Corrugated Stainless Steel Tubing (CSST).

Figure 1:
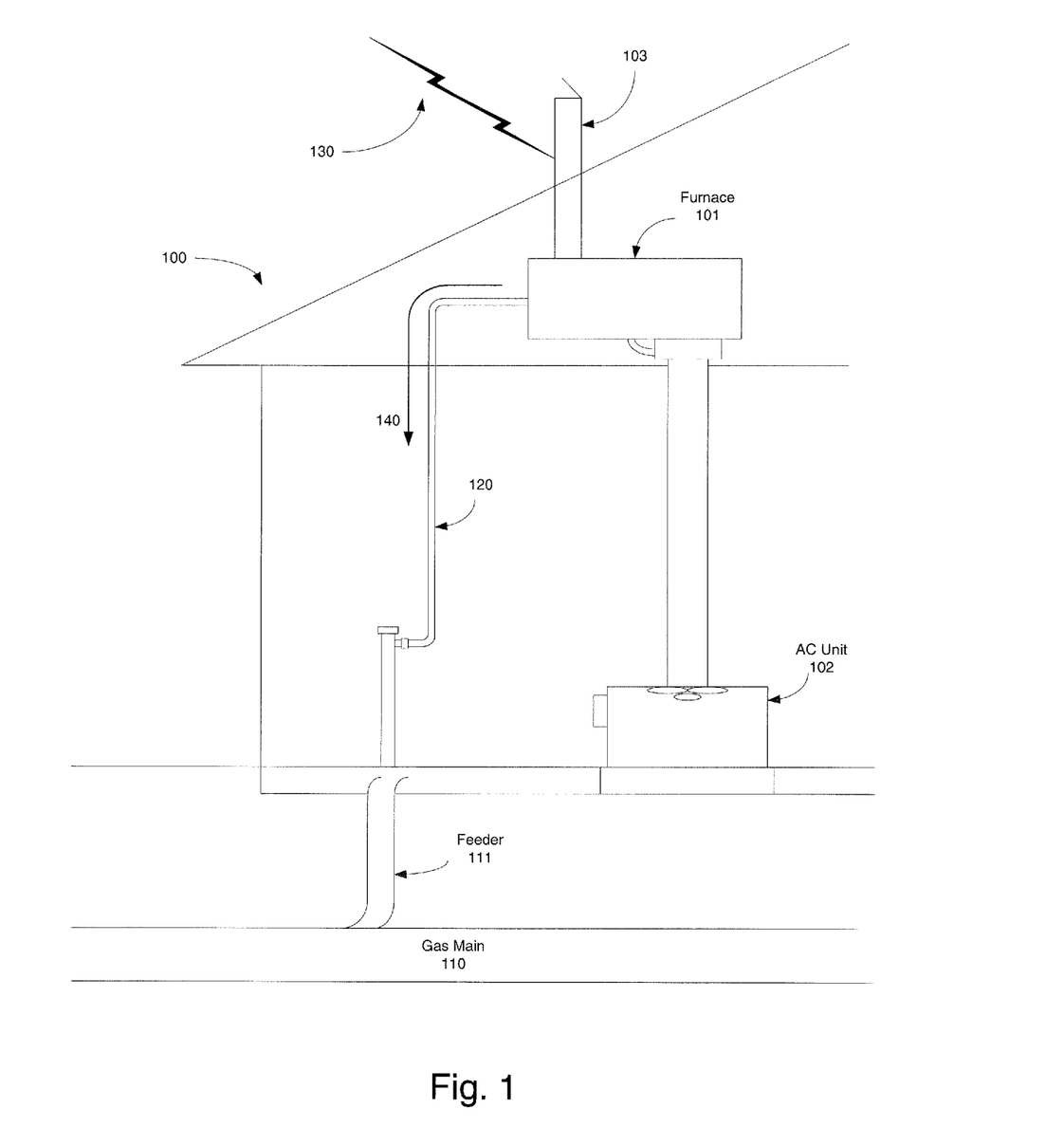
FIG. 1 shows a partial cross section a house illustrating the mechanical connection between the gas line, furnace and air conditioning system.

FIG. 1 shows a partial cross section a house illustrating the mechanical connection between the gas line, furnace and air conditioning system. In this example, the furnace 101 is located in the attic of the house 100. The air conditioning unit 102 is located at ground level. Gas from the gas main 110 enters the house 100 through a feeder line 111. A CSST line 120 connects the feeder 111 to the furnace 101.

The metal chimney 102 of the furnace 101 extends through the roof. If this chimney 103 is struck by lightning 130, the charge will often go to ground through the CSST line 120 as indicated by arrow 140.

Figure 2:
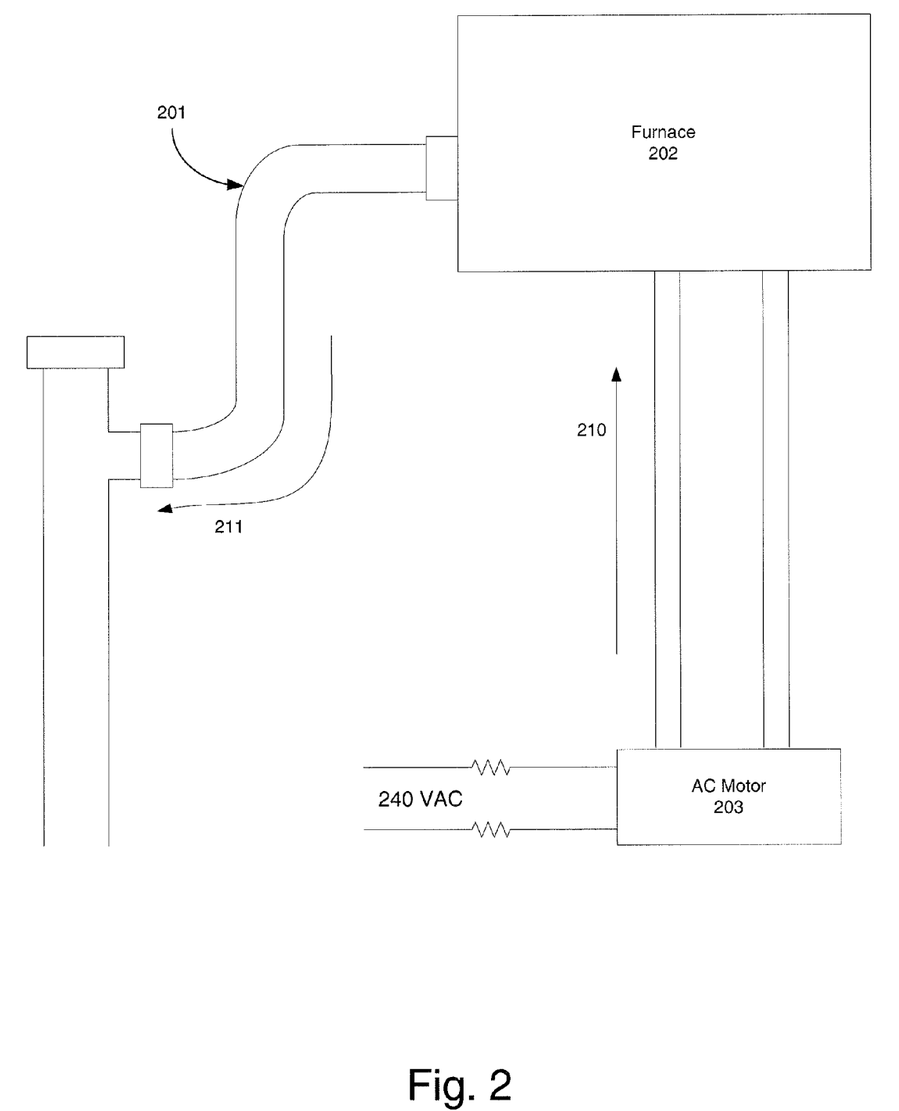
FIG. 2 illustrates another scenario for a CSST related gas fire in which the fires is induced by an electrical short from an appliance.

FIG. 2 illustrates another scenario for a CSST or gas appliance connector related gas fire in which the fire is induced by an electrical short from an appliance. FIG. 2 shows an arrangement similar to that in FIG. 1 involving a CSST line 201, a furnace 202 and an A/C unit 203. If the A/C motor 203 becomes stuck the windings in it burn out and short to ground though their physical connection to the furnace 202 and CSST line 201 as indicated by arrows 210, 211.

Figure 3:
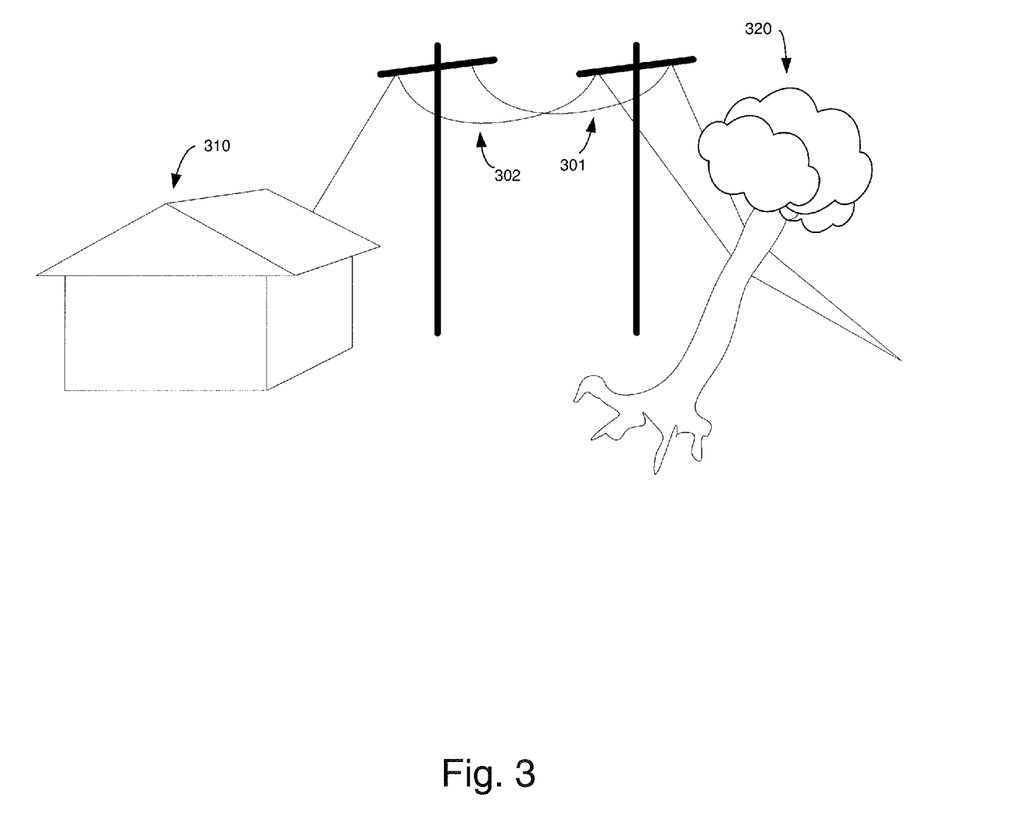
FIG. 3 shows yet another situation in which electrical grounding can damage CSST lines.

FIG. 3 shows yet another situation in which electrical grounding can damage CSST lines. In this example, a tree 320 has fallen across two power lines 301, 302 connected to a house 310. The tree 320 causes the high volt line 301 and the ground line 302 to touch together. In this situation the ground line 302 becomes energized and spills current through the entire house 310, which can result in the electrical current grounding through CSST lines as illustrated in FIGS. 1 and 2.

Figure 4:
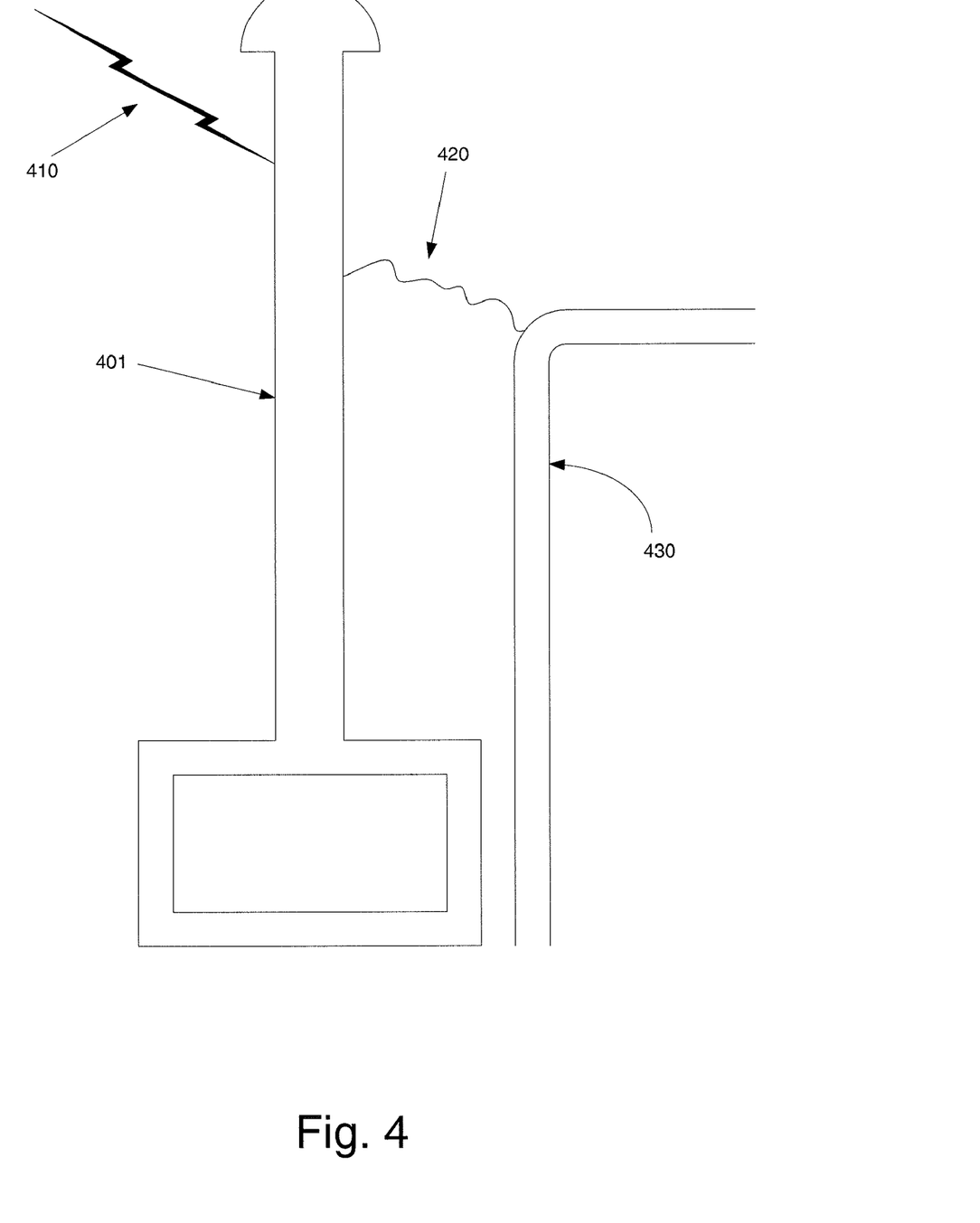
FIG. 4 depicts an example of a CSST perforation caused by electrical arcing.

FIG. 4 depicts an example of a CSST perforation caused by electrical arcing. In this case, the CSST 430 runs parallel to a metal chimney 401 but is not in direct physical contact with the chimney. If the chimney 401 is struck by lightning 410, the potential difference created by the lightning strike might be large enough to produce an electrical arc 420 between the chimney and the CSST 430. Such electrical arcing is most likely to produce perforation along the length of the CSST.

Figure 5:
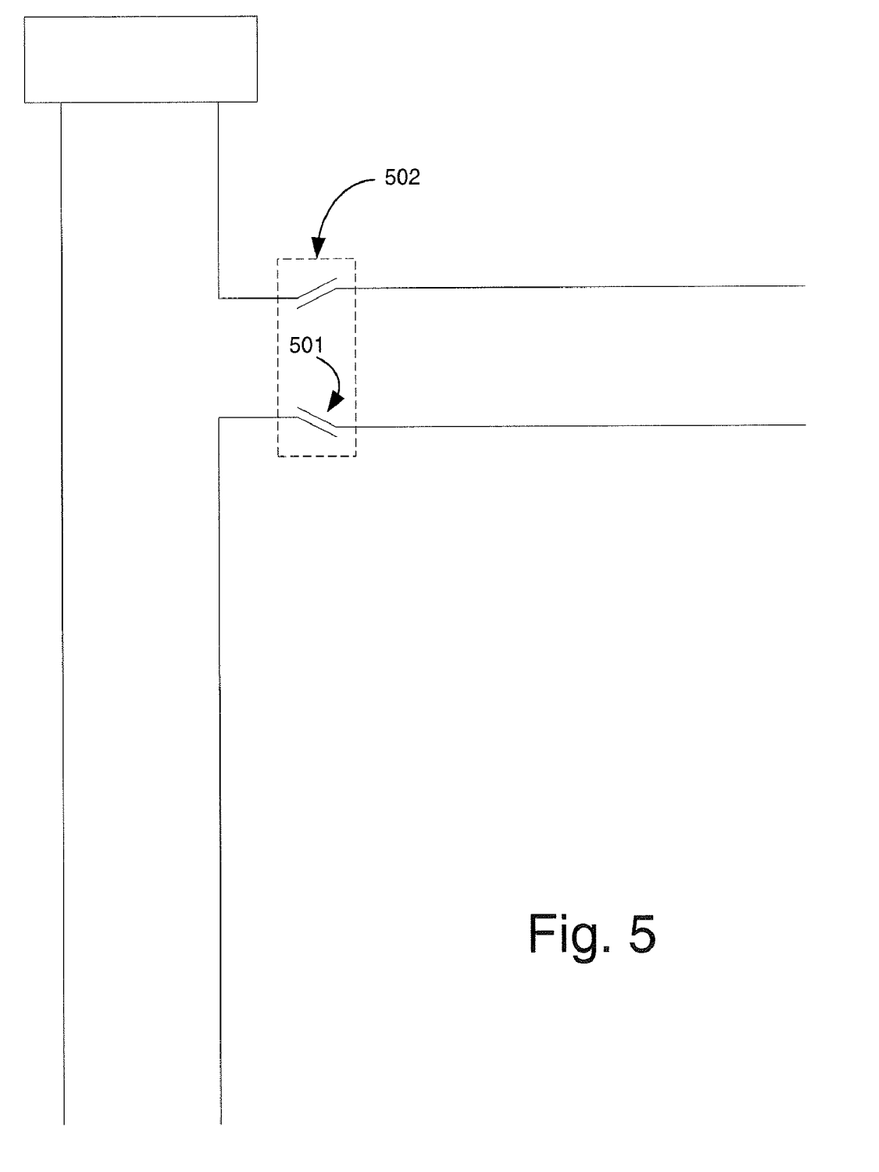
FIG. 5 shows a cross section view illustrating the physical interface between a CSST and gas pipe.

FIG. 5 shows a cross section view illustrating the physical interface between a CSST and gas pipe. Flexible appliance connectors, as recognized by the Fuel Gas Code and other codes, make use of flared connections at their ends 501, along with the usual nut 502 (often brass) to make the connection secure. One means of failure of these types of connections is brought about when current from electric discharges is sent down the appliance connector in an attempt to reach ground potential. As discussed above, examples of such discharges include lightning, floating neutral conditions, grounding out of air conditioning compressors, and energizing of ground circuitry by inadvertent shorting within appliances.

Another mode of failure occurs when during a "ground out event" the charge passes from the side of a connector to an adjacent metal surface. For example, if current is flowing through the gas line and the gas line is touching (on its side) the steel chassis, electricity may arc during the shorting process from the brass (nut) or stainless steel of the gas line to the steel chassis, causing a gas leak and resultant fire.

While the flared connections 501 are sufficient in terms of their ability to carry gas from a mechanical connection, the flared connection is subject to failure when required to carry electric current. The electric current often causes the flared connection to melt and arc, resulting in a gas leak and igniting the gas.

Figure 6A:
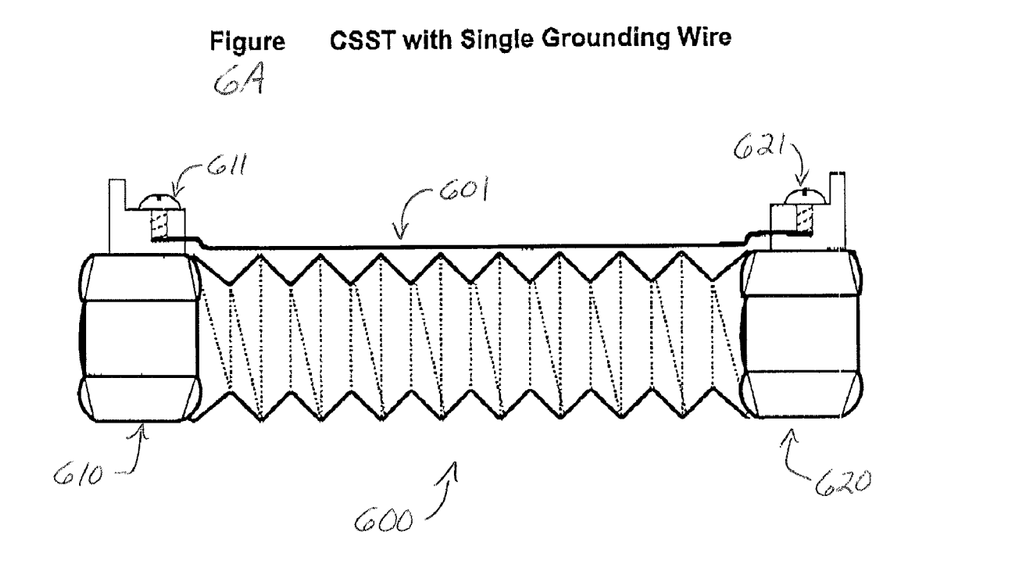
FIG. 6A shows a CSST with a single grounding wire in accordance with the present invention.

FIG. 6A shows a CSST with a single grounding wire in accordance with the present invention. The present invention reduces the risk of the types of failures described above by placing a copper ground wire 601 of ~#8 American Wire Gauge (AWG) or larger electrically in parallel with the length of CSST or the appliance connectors 610, 620. This ground wire 601 attaches to the end connectors 610, 620 at the set screws 611, 621 one on each end.

When the connector is fabricated at the factory, the brass nut on one end has a set screw and collar. The #8 wire is secured in this hole at the factory. On the opposite end of the connector, there is a similar collar and set screw. However, the loose end of the copper wire is not attached to the second nut until the nut has been tightened and all connections are leak tested. Thereafter, the parallel wire conductor can be threaded into the appropriate collar and held in position by the set screw.

Figure 6B:
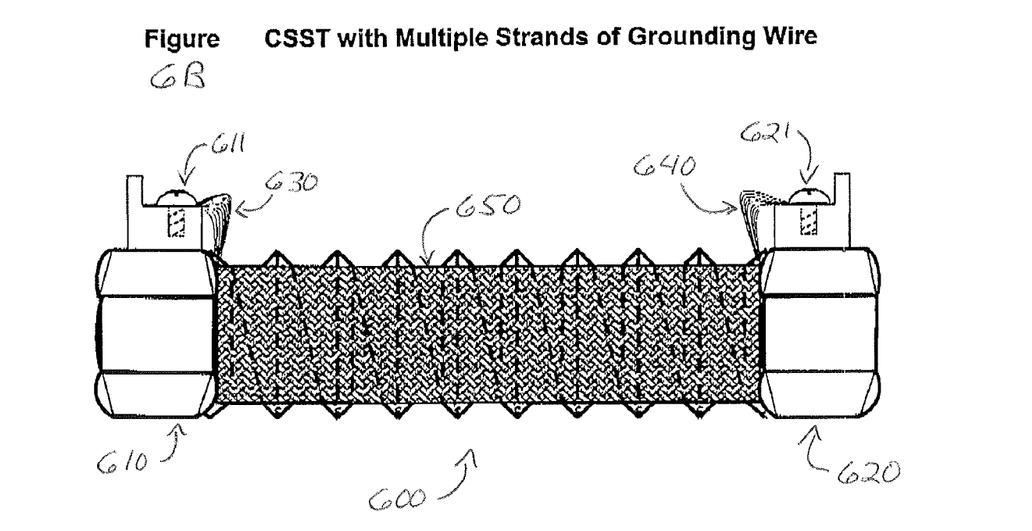
FIG. 6B shows an alternate embodiment of the present invention that employs multiple strands of grounding wire.

FIG. 6B shows an alternate embodiment of the present invention that employs multiple strands of grounding wire. In this embodiment, the brass nuts 610, 620 have collars 630, 640 that protrude from the top. The CSST flex line 600 is shrouded by a wire mesh 650, which is attached to the collars 630, 640 on each end.

The wire mesh shielding 650 terminates on each collar 630, 640 in a manner that allows the shielding to make electrical and mechanical contact with the nuts 610, 620 but allows the nuts to be rotated freely about the end of the flare and the coax.

In addition to application in new housing construction, the current shunting system of the present invention can easily be retrofitted to existing houses. In houses with black pipes, it is common to use appliance connectors to transition between the black pipe and the appliance; a gas appliance connector is similar to CSST in that it has thin walls, corrugations, and is easily bent or manipulated. These appliance connectors fail similarly to CSST when electrically injured. It is a simple matter to construct a gas appliance connector with the same current shunting as the present invention proposes for CSST. Thereafter, the present gas appliance connector can be replaced with the invention herein described.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A method of preventing electrically induced fires in gas tubing, the method comprising:
    (a) affixing connectors to each end of the gas tubing, wherein the connectors allow the tubing to be securely coupled to gas lines and appliances, allowing the gas tubing to carry gas between a gas line and an appliance, and wherein the connectors are made of a conductive material; and
    (b) coupling conductive wire to said connectors, wherein the conductive wire provides direct electrical contact between the connectors;
    (c) wherein if an electrical charge goes to ground via the gas tubing, the conductive wire carries the electrical current rather than the gas tubing itself, preventing damage to the tubing from the electrical current.

2. The method according to claim 1, wherein the gas tubing comprises Corrugated Stainless Steel Tubing (CSST).

3. The method according to claim 1, wherein said connectors are made of brass.

4. The method according to claim 1, wherein said conductive wire is made of copper.

5. The method according to claim 4, wherein the copper wire is approximately number 8 American Wire Gauge (AWG) or larger.

6. The method according to claim 1, wherein said conductive wire comprises a single wire.

7. The method according to claim 1, wherein said conductive wire comprises a mesh surrounding the gas tubing.

\* \* \* \* \*

UNITED STATES PATENT AND TRADEMARK OFFICE
CERTIFICATE OF CORRECTION

PATENT NO. : 7,562,448 B2
APPLICATION NO. : 11/183527
DATED : July 21, 2009
INVENTOR(S) : Mark E. Goodson It is certified that error appears in the above-identified patent and that said Letters Patent is hereby corrected as shown below:

In Column 5, after the paragraph ending at Line 30 (nuts to be rotated freely about the end of the flare and the coax.), please insert the following two paragraphs:

--Each of the embodiments of the invention depicted in FIGS. 6A and 6B keeps electrical current from damaging the flared ends of the CSST by providing an electrical shunt in the form of copper ground wire between the brass connectors on the ends. Since copper is a superior conductor to CSST, it can safely carry currents that the CSST was never designed to handle.

The braid/wire mesh technique depicted in FIG. 6B also has the benefit of mechanically protecting the connector from mechanical damage, damage from loose, energized conductors, damage from lightning, and damage caused by corrosives (e.g., some housekeepers have been known to use ammonia or the like on stove gas hoses).--

Signed and Sealed this

Ninth Day of March, 2010

David J. Kappos
*Director of the United States Patent and Trademark Office*